(12) United States Patent
Wan

(10) Patent No.: US 6,494,095 B1
(45) Date of Patent: Dec. 17, 2002

(54) MICRO ELECTROMECHANICAL SWITCH FOR DETECTING ACCELERATION OR DECELARATION

(75) Inventor: Lawrence A. Wan, Malibu, CA (US)

(73) Assignee: OpticNet, Inc., Hayward, CA (US)

(*) Notice: Subject to any disclaimer, the term of this patent is extended or adjusted under 35 U.S.C. 154(b) by 0 days.

(21) Appl. No.: 09/536,999

(22) Filed: Mar. 28, 2000

(51) Int. Cl.[7] .............................................. G01P 15/08
(52) U.S. Cl. ...................................... 73/514.26; 73/653
(58) Field of Search ...................... 73/514.26, 514.36, 73/649, 562, 653, 655; 250/200

(56) References Cited

U.S. PATENT DOCUMENTS

| | | | | |
|---|---|---|---|---|
| 3,961,185 A | * | 6/1976 | Brokebshire et al. | 73/514.26 |
| 4,130,355 A | * | 12/1978 | Ohtaki et al. | 396/167 |
| 4,453,812 A | * | 6/1984 | Suzuki et al. | 396/129 |
| 4,493,212 A | * | 1/1985 | Nelson | 73/514.26 |
| 4,497,560 A | * | 2/1985 | Nagaoka et al. | 396/106 |
| 4,567,771 A | * | 2/1986 | Nelson et al. | 73/653 |
| 4,592,235 A | * | 6/1986 | Fink | 73/514.26 |
| 4,662,225 A | * | 5/1987 | Koh et al. | 73/655 |
| 4,737,630 A | * | 4/1988 | Andersson | 73/514.26 |
| 4,792,931 A | * | 12/1988 | Nishida et al. | 367/149 |
| 5,063,781 A | * | 11/1991 | Conforti et al. | 73/651 |
| 5,276,322 A | * | 1/1994 | Carome | 73/514.26 |
| 5,633,494 A | * | 5/1997 | Danisch | 250/227.16 |
| 5,886,265 A | * | 3/1999 | Chatrefou | 73/651 |
| 5,936,294 A | * | 8/1999 | Zhang | 257/435 |
| 6,201,234 B1 | * | 3/2001 | Chow et al. | 250/214 LS |
| 6,202,488 B1 | * | 3/2001 | Cash | 73/514.26 |

* cited by examiner

*Primary Examiner*—Richard A. Moller
(74) *Attorney, Agent, or Firm*—Coudert Brothers LLP

(57) ABSTRACT

A micro electromechanical switch for detecting acceleration or deceleration includes a rectangular planar mass of, for example, etched silicon suspended on a pair of beams from an anchor located in the same silicon base. Motion in a plane of movement caused by acceleration or deceleration is detected by a pair of photodiodes and a light emitting diode located on opposite sides of the planar mass or shutter so that when the shutter moves the interruption of the light is sensed and thus acceleration or deceleration is indicated.

2 Claims, 2 Drawing Sheets

MICRO ELECTROMECHANICAL SWITCH FOR DETECTING ACCELERATION OR DECELARATION

BACKGROUND OF THE INVENTION

For feedback control systems, especially in the automobile industry, there is a need for a simple and reliable switch for sensing acceleration or deceleration; that is, G-forces. Such a switch should be inexpensive and immune to severe environmental conditions, and miniaturized.

OBJECTS AND SUMMARY OF THE INVENTION

It is therefore a general object of the present invention to provide a micro electromechanical switch for detecting acceleration or deceleration.

In accordance with the above object, there is provided a micro electromechanical (MEM) switch for detecting acceleration or deceleration comprising a micro electromechanical planar mass displaceable by the acceleration or deceleration from a rest position to a displaced position including means for suspending the planar mass from an anchor for linear movement in at least one plane.

Light emitting means above said planar mass with at least one photodiode means below the mass which is at least partially there between the two when the mass is in one of its positions. Modulation of light from the light emitting means caused by movement of the mass in the plane is sensed whereby acceleration or deceleration is indicated.

DETAILED DESCRIPTION OF PREFERRED EMBODIMENT

Figure 1:
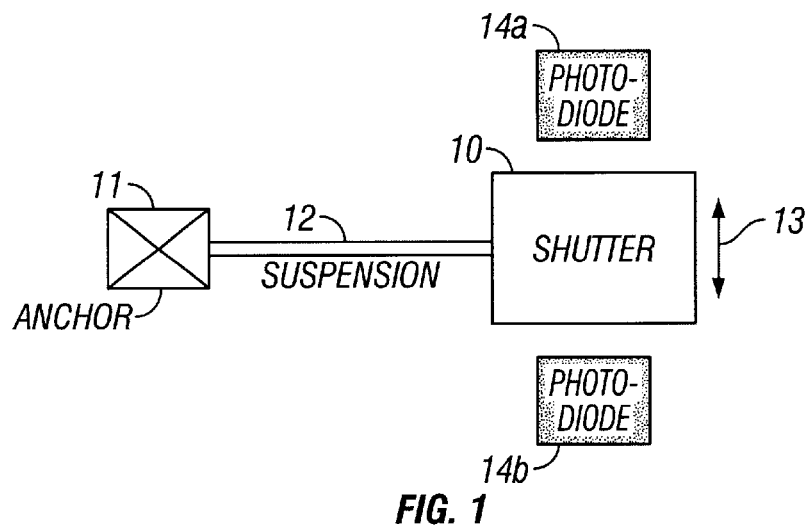
FIG. 1 is a simplified diagrammatic view in elevation of the present invention.

Referring now to FIG. 1, the micro electromechanical switch of the present invention includes a micro machined shutter on mass 10 constructed of a planar rectangular piece of silicon connected to an anchor 11 by suspension beams 12. Beams 12 allow the shutter to move in the bi-direction indicated by the double-ended arrow 13 to alternatively totally or partially cover the photodiodes 14a or 14b. In other words, shutter 10 is a mass displaceable in a bi-direction 13 by acceleration or deceleration due to the suspension of beam 12.

Figure 2:
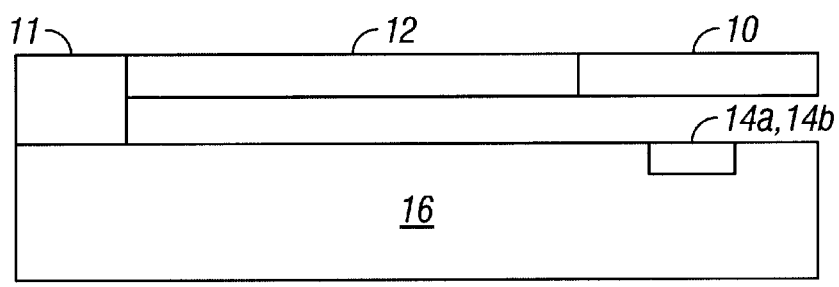
FIG. 2 is a side view of FIG. 1.

FIG. 2 illustrates the construction of FIG. 1 where a silicon base 16 is micro machined to provide the anchor 11, suspension beams 12 and the shutter 10. Embedded in the silicon base 16 are the photodiodes 14a, 14b. Thus, as illustrated in FIG. 3, which is an end view of FIG. 2, when shutter 10 is moved to the left or right it interrupts a light beam from the light emitting diode source 17 to thus, depending on the direction, affect the voltage or current output of photodiode 14a or 14b.

Figure 3:
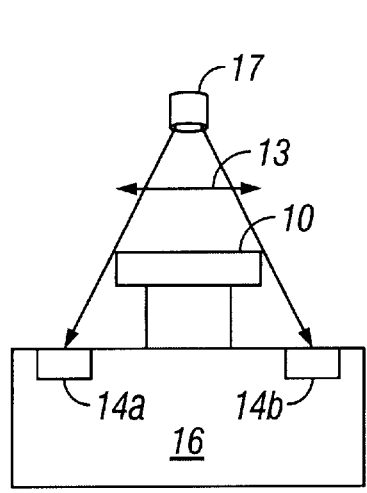
FIG. 3 is an end view of FIG. 2.
Figure 4:
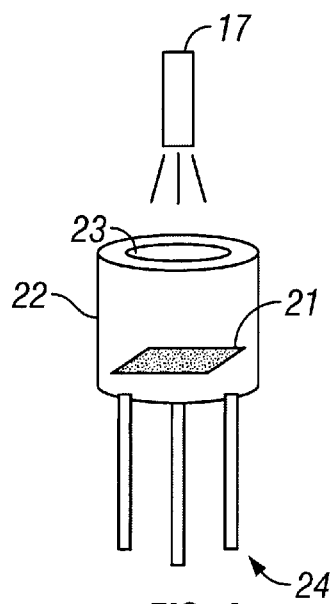
FIG. 4 is a partial perspective view showing how an actual physical device embodying the present invention would be installed.

FIG. 4 illustrates a conventional electronic package where the entire construction of FIGS. 1, 2 and 3 is indicated as the integrated circuit 21 in a container 22 having a typical conventional TO package and having a transparent lid 23 with light source 17 above it with input power and signal leads 24. As discussed above, such a device might typically be used in a feedback control system of a moving vehicle such as an automobile.

Figure 5:
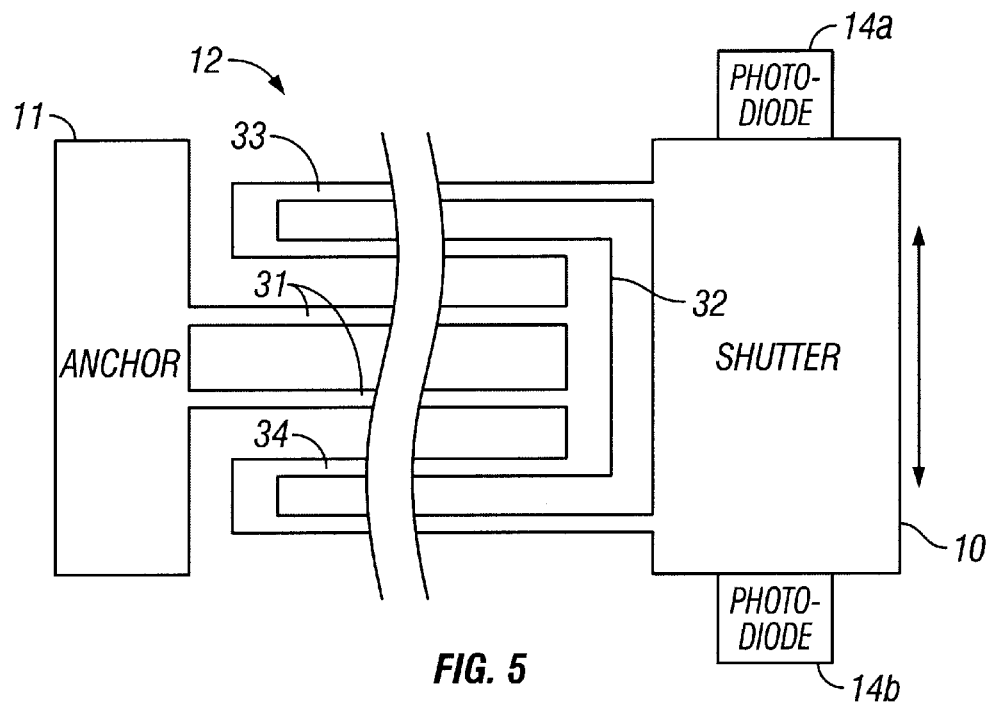
FIG. 5 is a enlarged planar view of FIG. 1 showing more detail.

The detailed construction of the suspension beam 12 is illustrated in FIG. 5 where from anchor 11 there is an outgoing pair of silicon arms 31 terminating at 32 and forming another convoluted pair of arms 33 and 34 which are connected to shutter 10. This is all accomplished with typical micro electromechanical techniques. For example, see the co-pending application, Ser. No. 09/299,472, filed Apr. 26, 1999, entitled METHOD OF FABRICATING ANGULAR RATE SENSOR FROM A STRUCTURAL WAFER OF SINGLE CRYSTAL SILICON, and assigned to the present assignee. In addition, there are several technical articles relating to MEMS technology.

Figure 6:
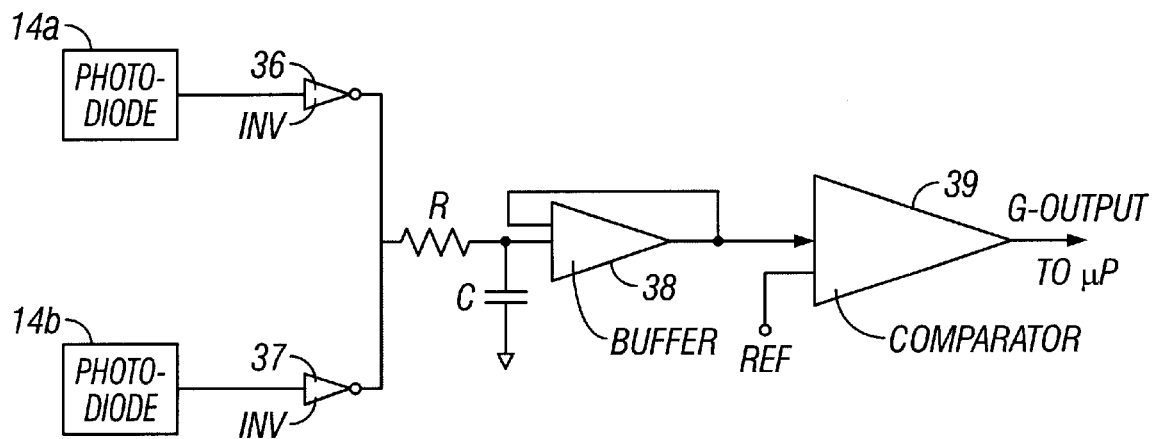
FIG. 6 is an electric circuit used in conjunction with the present invention.

FIG. 6 illustrates an electrical circuit which effectively prevents transient effects from producing a false G-force output. This is accomplished by feeding the outputs of the electric outputs of the photo detectors 14a, 14b through a pair of inverters 36 and 37 (this is because normally the photodiodes would be actuated by the light beam from the light emitting diode 17) through an RC integrating circuit as indicated, which through a buffer amplifier 38 and a comparator 39, having a reference input, will produce an output only if the shutter 10 has been displaced by acceleration or deceleration for a predetermined amount of time. In other words, the RC circuit integrates the signal to assure some threshold level is met which is, of course, again measured by the reference input to comparator 39. The output of comparator 39 then is stored or processed by a convenient microprocessor and used for any necessary feedback control action.

Thus, a micro electromechanical switch for detecting acceleration and deceleration has been provided.

What is claimed is:

1. A micro electromechanical (MEM) switch for detecting acceleration or deceleration comprising:

a micro electromechanical planar mass displaceable by said acceleration or deceleration from a rest position to a displaced position including means for suspending said planar mass from an anchor for linear movement in at least one plane;

light emitting means above said planar mass;

at least one photodiode means below said planar mass with said mass being at least partially there between said light emitting means and said photodiode means when said mass is in one of said positions; and means coupled to said photodiode means for sensing modulation of light from said light emitting means caused by movement of said mass in said plane whereby acceleration or deceleration is indicated, and including electrical processing means for processing the output of said photodiode means for providing an output signal only if said mass is displaced for a predetermined amount of time, said electrical processing means including an integrating circuit responsive to said time coupled to a comparator having a reference input.

2. A switch as in claim 1 where said electrical processing means also includes an inverter directly coupled to said photodiode means.

\* \* \* \* \*